US009169004B2

(12) United States Patent
Essinger et al.

(10) Patent No.: US 9,169,004 B2
(45) Date of Patent: Oct. 27, 2015

(54) SYSTEM FOR MOTORIZING A WHEEL CONNECTED TO A SUSPENSION

(75) Inventors: Olivier Essinger, La Tour de Peilz (CH); Cesare Stacchi, Hinusio (CH)

(73) Assignees: AIRBUS OPERATIONS LIMITED, Filton, Bristol (GB); MICHELIN RECHERCHE ET TECHNIQUE S.A., GRANGES-PACCOT (CH); COMPAGNIE GENERALE DES ETABLISSEMENTS MICHELIN, CLERMONT-FERRAND (FR)

(*) Notice: Subject to any disclaimer, the term of this patent is extended or adjusted under 35 U.S.C. 154(b) by 598 days.

(21) Appl. No.: 13/395,803

(22) PCT Filed: Dec. 17, 2010

(86) PCT No.: PCT/FR2010/052780
§ 371 (c)(1),
(2), (4) Date: May 15, 2012

(87) PCT Pub. No.: WO2011/073587
PCT Pub. Date: Jun. 23, 2011

(65) Prior Publication Data
US 2012/0217340 A1 Aug. 30, 2012

(30) Foreign Application Priority Data
Dec. 17, 2009 (FR) ...................................... 09 59143

(51) Int. Cl.
*B64C 25/00* (2006.01)
*B64C 25/40* (2006.01)
(52) U.S. Cl.
CPC ............. *B64C 25/405* (2013.01); *Y02T 50/823* (2013.01)

(58) Field of Classification Search
CPC ........... B64C 25/405; B64F 2700/6238; B64F 1/002; B64F 1/10
USPC .................................................... 244/50, 103 S
See application file for complete search history.

(56) References Cited

U.S. PATENT DOCUMENTS

| 2,320,547 | A | | 6/1943 | Tiger | |
|---|---|---|---|---|---|
| 3,762,670 | A | * | 10/1973 | Chillson | 244/50 |
| 3,764,094 | A | | 10/1973 | Cross | 244/50 |
| 3,850,389 | A | * | 11/1974 | Dixon | 244/103 S |
| 3,874,619 | A | | 4/1975 | Collins et al. | 244/50 |
| 3,977,631 | A | | 8/1976 | Jenny | 245/50 |
| 7,445,178 | B2 | * | 11/2008 | McCoskey et al. | 244/50 |
| 8,220,740 | B2 | | 7/2012 | Cox et al. | 244/103 R |
| 2003/0233900 | A1 | | 12/2003 | Fujikawa et al. | 74/457 |

(Continued)

FOREIGN PATENT DOCUMENTS

DE 10 2008 006 295 A1 1/2008
GB 2 210 833 A 6/1989

(Continued)

*Primary Examiner* — Brian M O'Hara
(74) *Attorney, Agent, or Firm* — Fitzpatrick, Cella, Harper & Scinto

(57) ABSTRACT

A motorizing system is provided for powering a wheel associated with a suspension of an aircraft, so that the aircraft can be moved around on ground. The motorized system includes a motor unit, a drive member that is structured to be secured to the wheel, and a clutch device that connects an output shaft of the motor unit to the drive member. The motor unit is structured to be secured to a sprung part of a suspension strut. A positive transmission occurs between the motor unit and the drive member.

23 Claims, 7 Drawing Sheets

(56) References Cited

U.S. PATENT DOCUMENTS

| | | | |
|---|---|---|---|
| 2007/0158497 A1 | 7/2007 | Edelson et al. | 244/103 S |
| 2009/0218440 A1 | 9/2009 | Dilmaghani et al. | 244/50 |
| 2009/0294577 A1 | 12/2009 | Roques et al. | 244/50 |
| 2012/0153075 A1 | 6/2012 | Wilson et al. | 244/50 |
| 2013/0200210 A1 | 8/2013 | Oswald et al. | 244/50 |

FOREIGN PATENT DOCUMENTS

| | | |
|---|---|---|
| GB | 2 323 345 A | 9/1998 |
| JP | 2004-68964 A | 3/2004 |
| WO | WO 2008/001013 A1 | 1/2008 |
| WO | WO 2010/063895 A1 | 6/2010 |

\* cited by examiner

SYSTEM FOR MOTORIZING A WHEEL CONNECTED TO A SUSPENSION

FIELD OF THE INVENTION

The present invention relates to a motorizing system for powering a wheel associated with a suspension for moving an aircraft around on the ground.

BACKGROUND

The concept of motorizing the movement of aircraft on the ground means motorizing the aircraft so that they can move around autonomously but at low speeds, like an aeroplane does before it takes off or after it has landed at airports; this is what is commonly known as "taxiing". It does not therefore here mean motorizing the wheel in order to bring it up to a speed consistent with the landing speed as has already been proposed in the prior art.

A known motorizing system for powering a wheel associated with a suspension, is of the type comprising a motor unit and a drive member secured to the wheel.

However, such a system has a certain sensitivity to shocks, this being especially great and damaging when the speed of travel along the ground of the vehicle carrying the motorizing system is high and this ground is uneven.

Another system for motorizing a wheel associated with a suspension is known and this is of the type comprising a motor unit carried by the sprung part of the suspension strut and a drive member secured to the wheel.

Such a system often has the disadvantage that the motor unit remains lodged in the part covered by the belly of the aeroplane without the possibility of being cooled by the ambient air. In addition, the mechanical transmission to the wheel is often achieved in the form of gearings which go through various changes of angle of the associated shafts, something which is detrimental to the efficiency of the transmission and requires increased accuracy of the attachment points in order to ensure that the gearings mesh correctly.

BRIEF DESCRIPTION OF EMBODIMENTS OF THE INVENTION

The present invention seeks to produce a motorizing system that is markedly less sensitive to shocks, without imposing any additional cooling constraint on the aircraft and which affords a better efficiency of the mechanical transmission.

According to the invention, in the motorizing system of the aforementioned type, the motor unit is secured to a sprung part of a suspension strut, the motorizing system further comprising a clutch device connecting an output shaft of the motor unit to the drive member, the transmission between the motor unit and the drive member being a positive transmission.

Thus, the unsprung mass of the motorizing system is minimal and limited to the drive member which is secured to the wheel. By contrast, the motor unit is therefore sprung. If the vehicle concerned is an aeroplane, this distribution of the motorizing system between the sprung part and the unsprung part allows the motorizing system to experience less of a shock upon landing. In addition, because only the drive member is secured to the wheel, the mass added to the unsprung part is minimized, making it possible to limit the extent to which the landing gear is reinforced.

According to a first alternative form, the motor unit comprises an electric motor and a reduction system connecting the output shaft of the motor to the drive member.

According to a second alternative form, the reduction system is secured to the motor.

According to a third alternative form, the clutch device is configured in such a way as to be able to move the motor unit into an engaged position in which this unit is connected to the drive member, and a disengaged position in which this unit is separated therefrom.

According to a fourth alternative form, the clutch device is configured in such a way as to allow the motor unit to disengage automatically if the load transmitted between the wheel and at least one motor that forms part of the motor unit exceeds a given level.

According to a fifth alternative form, the clutch device is configured in such a way that the motor unit is mounted to rotate with respect to the sprung part of the suspension strut, about a horizontal axis.

According to a sixth alternative form, the clutch device comprises two links defining the instantaneous axis of rotation of the motor unit.

According to a seventh alternative form, the clutch device comprises a movement system allowing the motor unit to be moved from one of its two, engaged and disengaged, positions into the other.

According to an eighth alternative form, the movement system comprises a driving element.

According to a ninth alternative form, the driving element is formed of an actuating jack.

According to a tenth alternative form, the actuating jack is an electric actuating jack which comprises a drive motor which is arranged in the jack, a nut which is mounted for translational movement and a screw that converts the rotational movement of the drive motor into a translational movement of the nut.

According to an eleventh alternative form, the movement system comprises a return element designed to move the motor unit in the opposite direction to the direction imposed by the driving element.

According to a twelfth alternative form, the return element is formed by a return spring.

According to a thirteenth alternative form, the actuating jack is able to move the motor unit into its in-mesh position, and the return spring is designed to drive the motor unit into its out-of-mesh position.

According to a fourteenth alternative form, the movement system is designed to apply to the motor unit a force higher than a limiting value necessary in order for the motor unit to remain in the engaged position.

According to a fifteenth alternative form, the drive member is an ring gear carried by the rim of the wheel and designed to enter into mesh with the output gear of the motor unit when the latter is in its engaged position.

According to a sixteenth alternative form, the in-mesh position of the output gear is defined by two rolling lips carried by the ring gear coming into abutment without sliding on two runway tracks carried by the output gear.

According to a seventeenth alternative form, the gear is carried by the output shaft of the motor unit via a constant-velocity joint.

The invention also relates to an assembly of two motorizing systems according to the first aspect of the invention, this assembly being designed to be associated with one and the same suspension strut, the two wheels being coaxial and the two motor units being secured to one another.

According to a first alternative form, the two motor units of the assembly of two motorizing systems are arranged between the two wheels.

According to a second alternative form, the two motor units of the assembly of two motorizing systems are arranged behind the suspension strut.

According to a third alternative form, the assembly of two motorizing systems comprises just one clutch device common to both systems which allows the motor unit of each wheel to be disengaged at the same time.

According to a fourth alternative form, in the assembly of two motorizing systems, the two motor units are arranged in a V-shape, the point of the V corresponding to the common axis of the two output gears of the two reduction systems, and each upper end corresponding to the axis of a motor.

Such a motorizing system or such an assembly of two motorizing systems, as the case may be, is advantageously used to motorize a main landing gear of an aircraft.

BRIEF DESCRIPTION OF THE DRAWINGS

Other specifics and advantages of the present invention will become apparent from the embodiment given by way of non-limiting example and illustrated by the attached drawings in which.

DETAILED DESCRIPTION OF EMBODIMENTS OF THE INVENTION

Figure 1:
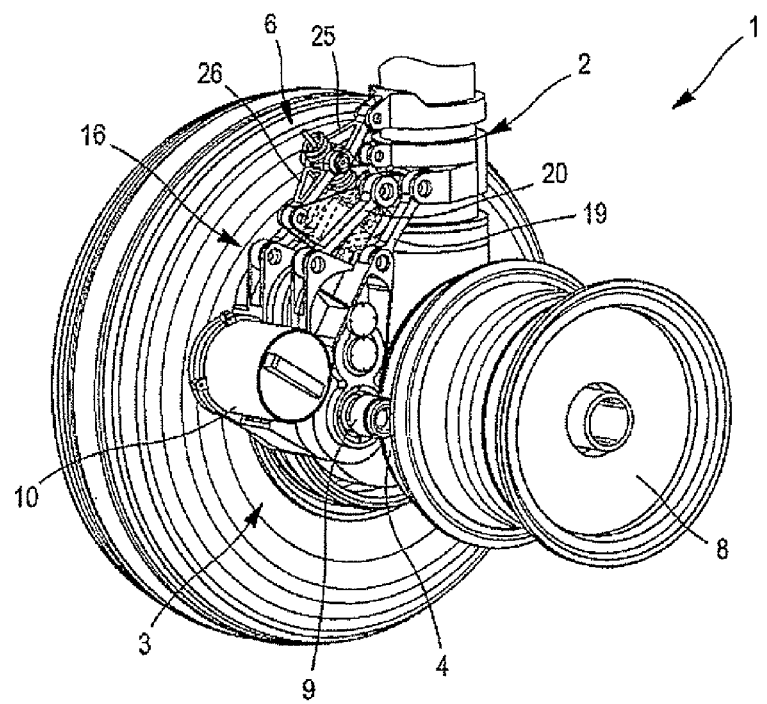
FIG. 1 is a perspective view of an aeroplane landing gear equipped with an assembly of two wheel motorizing systems according to the present invention, the assembly being engaged with the wheels and the nearest wheel being depicted without its tyre.

FIG. 1 depicts a main landing gear 1 of an aeroplane, one of the two wheels 5 of this landing gear being depicted without its tyre for the sake of clarity. Apart from the two wheels 5 which are coaxial, and the suspension strut 2 that carries these two wheels 5, the landing gear 1 also comprises an assembly of two wheel motorizing systems, namely one system per wheel 5. Having one motorizing system for each wheel 5 eliminates the need to add a differential and allows the speed of the wheels 5 to be adapted in bends. It also allows the loads on the suspension and on the wheel motorizing system to be partially equalized. In addition, it distributes load over all the tyres and therefore evens out and limits tyre wear.

A motorizing system according to the present invention comprises a motor unit 3 which is carried by the sprung part 2a of the suspension strut 2, a drive member 4 which is secured to the wheel 5, and a clutch device 6 which allows a gear 9 secured to the output shaft 7 of the motor unit 3 to be connected to the drive member 4.

As illustrated in the various figures, in this embodiment, the drive member 4 secured to the wheel 5 is formed of an ring gear 4 carried by the rim 8 of this wheel 5, this ring gear 4 entering into mesh with the output gear 9 of the motor unit 3 when the latter is in its engaged position. The ring gear 4 can be attached to the rim or machined directly thereon. This type of tooth and gear transmission is classified as a "positive" transmission as opposed to friction transmission systems such as systems involving friction rollers. A positive transmission is not dependent on the coefficient of friction and is therefore for example insensitive to the weather or to the degree of wear of the elements involved. Systems involving toothed belts are therefore also classified as positive transmissions, whereas plain (flat or Vee) belts are classified as friction transmission systems.

Moreover, in the present embodiment (cf. FIG. 7), the motor unit 3 comprises a motor 10 (more specifically an electric motor which, in this instance, is a brushless synchronous motor) and a reduction system 11 which allows the output shaft of the motor 10 to be connected to the drive member 4. Here, the reduction system 11 is secured to the motor 10.

Figure 7:
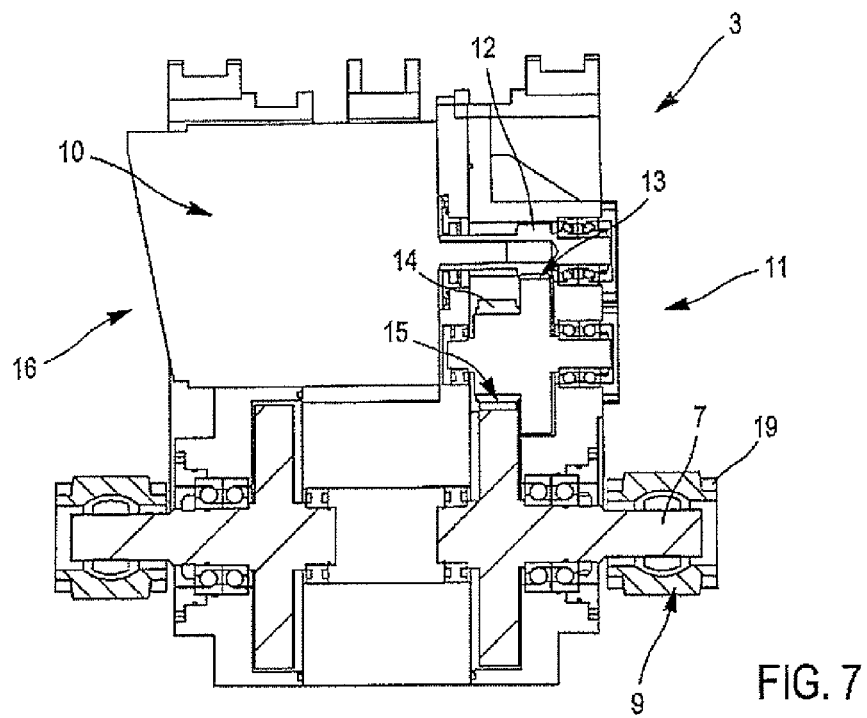
FIG. 7 is a view in section on a plane passing through the three axes of rotation of one of the two reduction systems.

As illustrated in FIG. 7, the reduction system 11 comprises two stages arranged in series. Here, each stage is formed of a simple gearset. Furthermore, the motorizing system comprises a third reduction stage formed by the output gear 9 of the motor unit 3 (more specifically the output gear 9 of the reduction system 11) and the ring gear 4 carried by the wheel 5.

More specifically, the first stage of the reduction system 11 is formed by the meshing of a first driving gear 12 carried by the output shaft of the motor 10 and of a first gear wheel 13 (the reduction ratio here is 3). The second stage is formed by the meshing of a second gear 14 carried by the first gear wheel 13 and of a second gear wheel 15 (the reduction ratio here is 2.5). The third stage (outside the motor unit) is formed by the meshing of the output gear 9 of the motor unit 3 carried by the output shaft 7 secured to the second gear wheel 15 and by the ring gear 4 carried by the wheel 5 (the reduction ratio here is 6.8).

In the assembly of two motorizing systems illustrated in FIG. 1, the two motor units 3 are secured to one another (here they are protected from the outside by one and the same casing 16). For reasons of compactness, the two motor units 3 are arranged between the two wheels 5. Further, to limit the risk in the event of a collision with external objects (or birds), especially at the moment of landing and take-off, the two motor units 3 are positioned behind the suspension strut 2.

Figure 8:
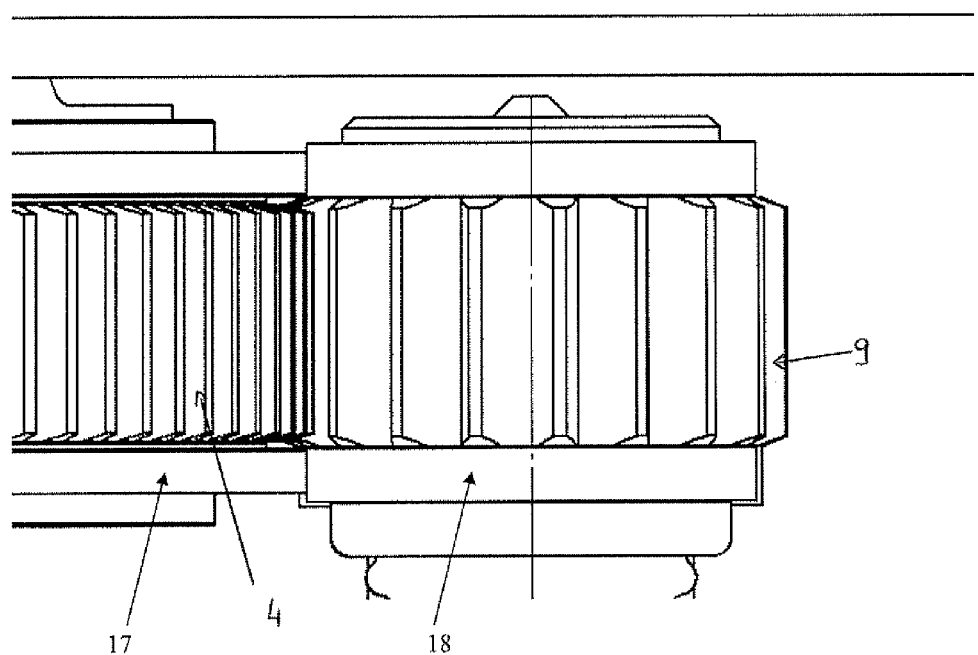
FIG. 8 is a view illustrating the collaboration between a wheel and the output shaft of the corresponding motor unit.
Figure 9:
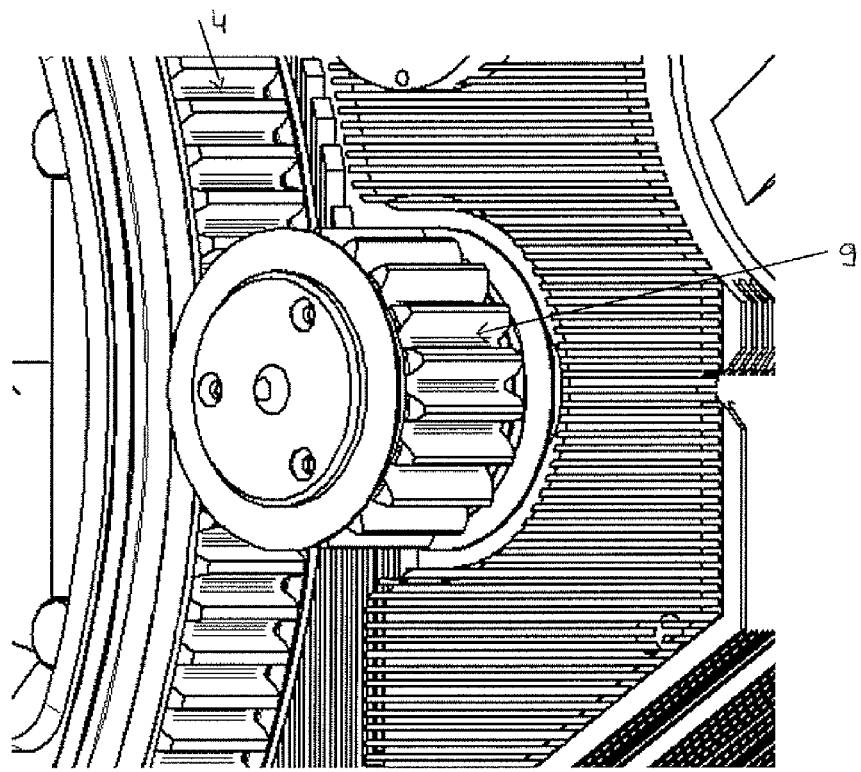
FIG. 9 is a perspective view of the wheel/gear connection of FIG. 8.
Figure 10:
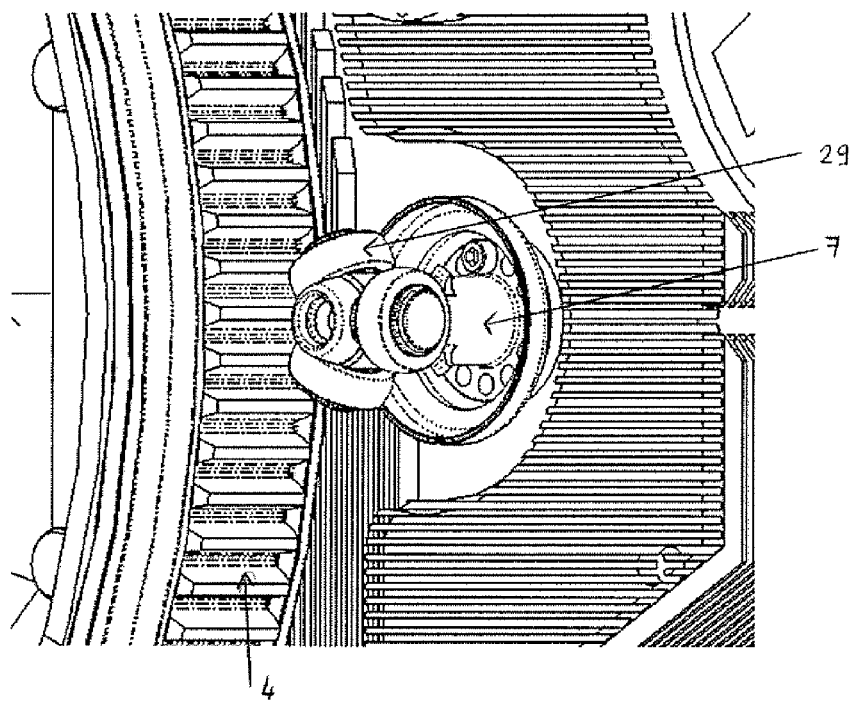
FIG. 10 is a perspective view similar to FIG. 9 but without the gear.

In addition, in order to define the position of meshing of the motor unit 3, the ring gear 4 carries two rolling lips 17 (cf. FIG. 8) which are designed to accept two runway tracks 18 carried by the output gear 9 of the motor unit 3. These roll without sliding and therefore without friction because the rolling diameters correspond to the pitch circle diameters of the gears.

In order for the assembly of the two motorizing systems to follow the vertical movement of the wheel with respect to the position of the shock absorber which is dependent on the aeroplane load and whether or not it is cornering, the two motor units 3 are arranged in such a way that their output shafts 7 are coaxial.

In order to be able to house the two motor units 3 between the two wheels 5 while at the same time meeting the requirement of simultaneous meshing, in the present embodiment, aside from the use of reduction systems 11 with two simple stages, the two motor units 3 are arranged in a V shape. In addition, this V-shaped layout allows the motor units 3 not to touch the ground upon landing if a tyre bursts and protects the second motor from impacts (birds, etc.). The lowermost point of the V corresponds to the common axis of the two output shafts 7 of the two reduction systems 11, each upper end of the V corresponding to the axis of a motor 10. In addition, this V-shaped layout of the reduction gears is advantageous for gear lubrication. During operation, the gears cause the oil (which at rest is in the reservoir situated in the point of the V) to circulate to the first stage, and this allows all the gear pairs to be lubricated.

Figure 2:
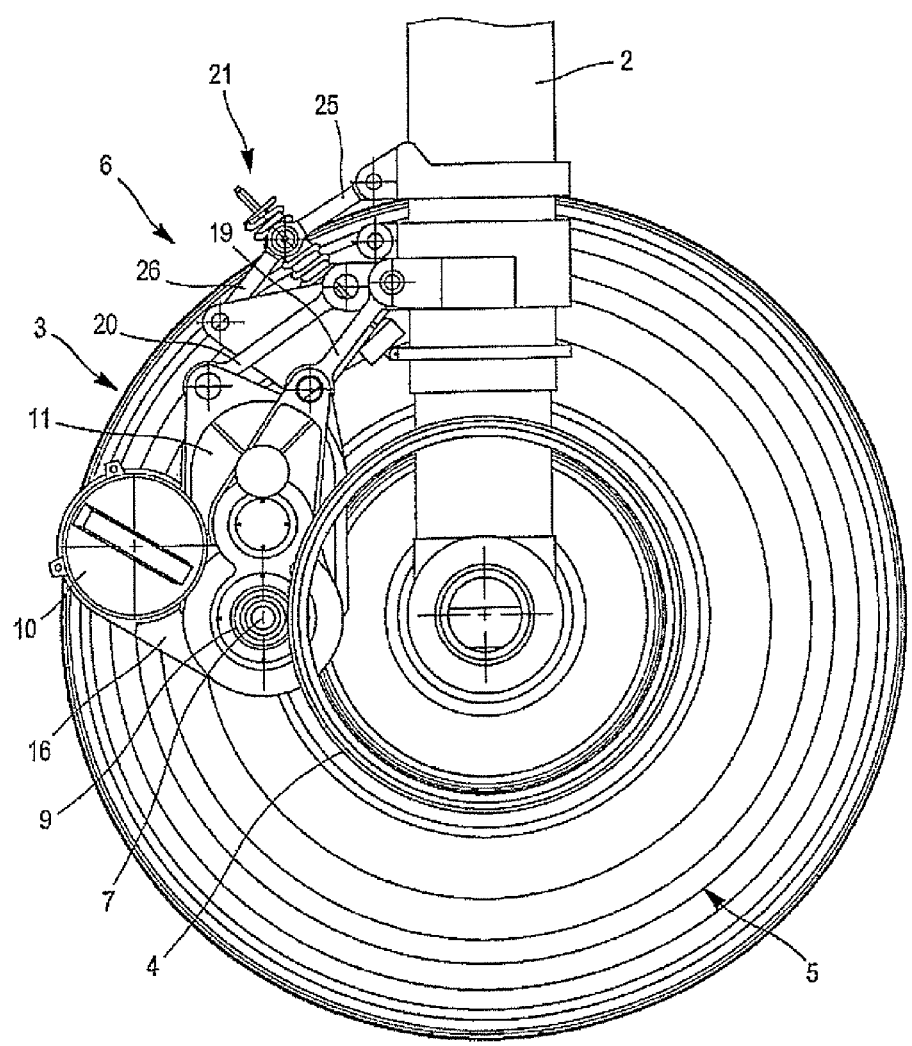
FIG. 2 is a view in section on a plane perpendicular to the axis of the wheels of the landing gear of FIG. 1, the assembly of two systems being in the engaged position.
Figure 3:
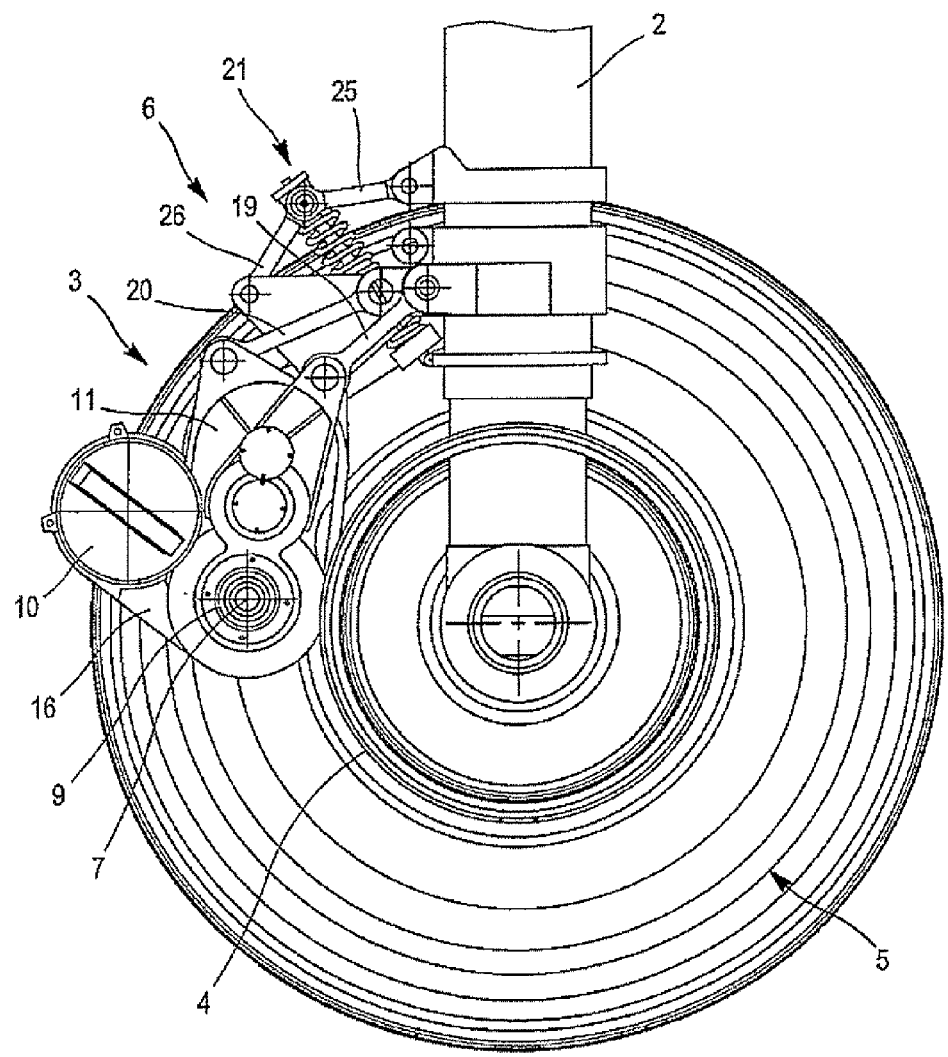
FIG. 3 is a view similar to FIG. 2, the assembly of the two systems being in the disengaged position.

Moreover, the clutch device 6 of a motorizing system is configured in such a way as to be able to move the motor unit 3 between an engaged position in which this unit 3 is connected to the drive member 4 (output gear 9 of the reduction system 11 in mesh with the ring gear 4 of the wheel 5, as illustrated in FIG. 2), and a disengaged position in which this unit 3 is separated therefrom (gear 9 out of mesh with the annular gear 4 as illustrated in FIG. 3). In the present embodiment, in order to have simultaneous engagement of the two motor units 3 with the two wheels 5 and because the two motor units 3 are joined together, the assembly of two motorizing systems comprises just one clutch device 6. However, the speeds of the gear 9 and of the ring gear 4 are synchronized separately for each wheel 5/motor unit 3 pairing.

In the present embodiment, the clutch device 6 is configured in such a way that the motor unit 3 is mounted for rotation (with respect to the sprung part of the suspension strut 2) about a horizontal pivot axis. Thus, the clutch engagement corresponds to a movement of the motor unit 3 downwards and forwards, and disengagement to a movement upwards and backwards (which movement is illustrated in FIG. 4 by the various arrows).

In addition, in an alternative form that has not been depicted, in order to permit a certain degree of freedom of relative horizontal movement of the reduction gears in the event of deformation of the landing gear, and thus ensure that the bearing forces on each wheel are approximately equal, the reduction unit is mounted on the clutch device via a substantially vertical rotary pivot pin.

Associated with the clutch device 6 is an electronically controlled speed matching system. This system comprises a sensor for measuring the speed of the wheel 5 and means for commanding the corresponding rotational speed of the motor 10.

Figure 4:
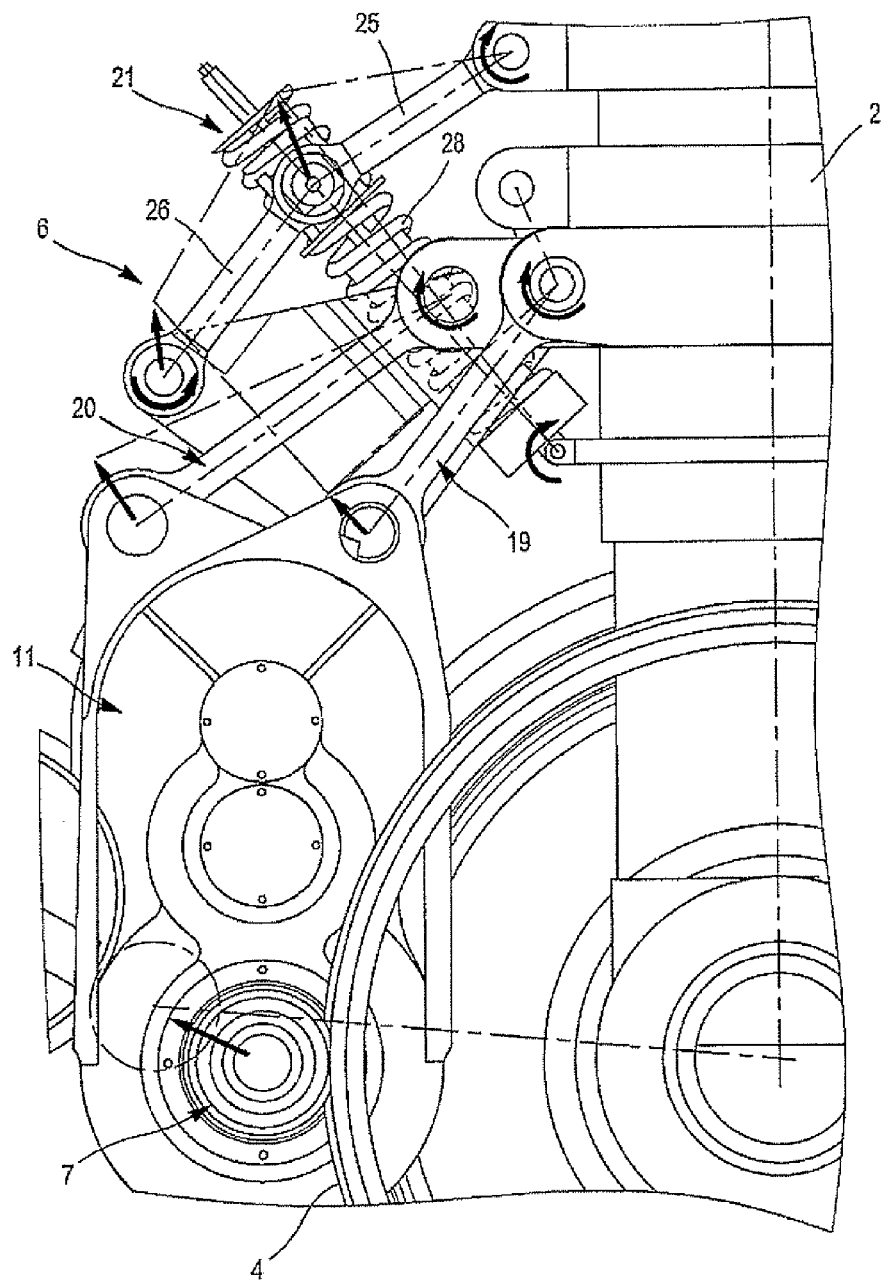
FIG. 4 is a view on a plane perpendicular to the axis of the wheels, of the clutch device for the assembly of the two systems.
Figure 6:
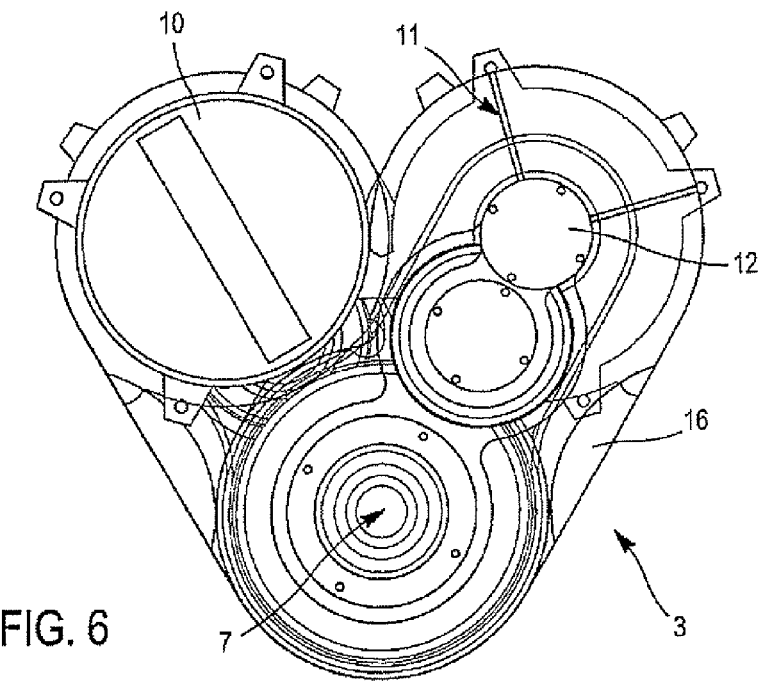
FIG. 6 is a view in section on a plane perpendicular to the axes of the shafts about which the two motor units of the assembly of the two motorizing systems rotate.

In the present embodiment, as illustrated in FIG. 4, the clutch device 6 comprises two concurrent links 19, 20 the intersection of which defines the instantaneous axis of rotation of the motor unit 3 (more specifically, here, there are two pairs of links). Each link 19, 20 is mounted for rotation, via one of its ends, on the motor unit 3, and via the other on the sprung part of the suspension strut 2.

Figure 5:
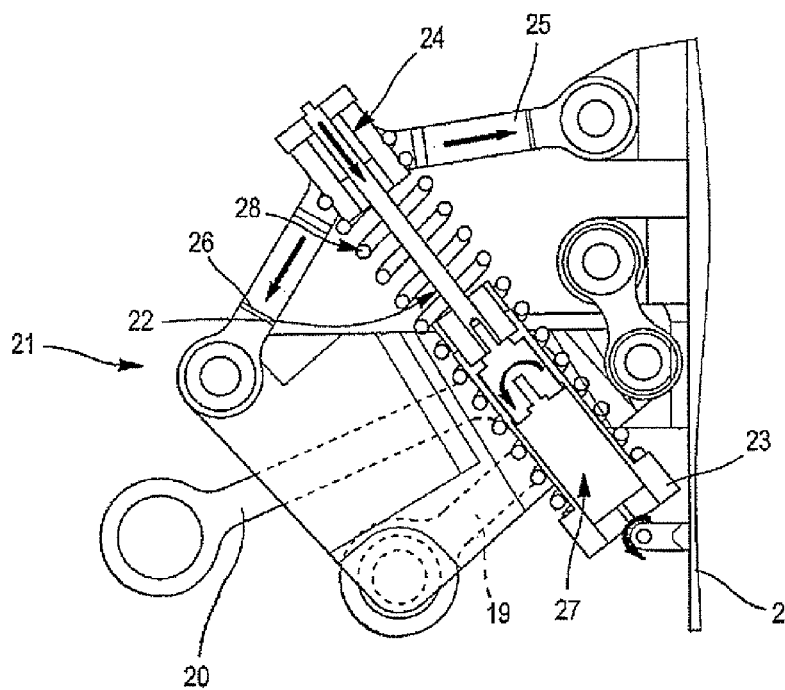
FIG. 5 is a view in section of the movement system of the clutch device.

The clutch device 6 also comprises a movement system 21 allowing the motor unit 3 to be moved from one of its two, engaged and disengaged, positions into the other. As illustrated in FIG. 5, the movement system 21 comprises an actuating jack 22 connected to the motor unit 3 and to the sprung part of the suspension strut 2. More specifically, one end of the actuating jack (here the jack 23) is mounted for rotation about a horizontal axis on the sprung part of the suspension strut 2. The other end (the rod 24) is mounted for rotation on two links 25, 26 about two horizontal axes, one 25 of these links is also mounted for rotation about a horizontal axis on the sprung part of the suspension strut 2, the other link 26 for its part being mounted for rotation about a horizontal axis on the motor unit 3.

Here, the actuating jack 22 is an electric actuating jack. More specifically, this actuating jack 22 comprises a drive motor 27 which is arranged inside the jack 23, a nut 24 to which the two links 25, 26 are connected and a screw (recirculating ball or roller screw) that allows the rotational movement of the drive motor 27 to be converted into a translational movement of the nut 24. This ball screw is mounted on the output of a planetary-type reduction gear, itself mounted on the drive motor 27.

The clutch device 6 (more specifically the movement system 21) allows sufficient force to be applied to the output gear 9 of the motor unit 3 to keep it in mesh with the annular gear 4.

In the present example, in order for the motor unit 3 to disengage as soon as the electrical power supply to the drive motor 27 of the actuating jack 22 is cut, the movement system 21 comprises a return spring 28 which, in this instance, envelopes the actuating jack 22. Thus, the actuating jack 22 is used to drive the motor unit 3 into its in-mesh position, and the spring 28 is used to drive it into its out-of-mesh position. The spring 28 also ensures that there is no meshing of the gear 9 with the ring gear 4 upon landing, while at the same time absorbing the shock of the aircraft touching down if the rotation of the screw is freed.

The movement system 21 is designed to apply to the motor unit 3 (to the gear 9) a force higher than a limit value necessary in order for the motor unit 3 to remain in the engaged position (in order for the gear 9 and the ring gear to remain in mesh). This force may be constant or, on the other hand, set to a value tailored to the force necessary to allow the transmission of driving or braking torque.

This is also a system that disengages itself if one of the wheels or one of the motors locks up, irrespective of the direction in which the aeroplane is travelling, as soon as the load generated by the toothsets exceeds that of the engagement system. Thus, disengagement is forced by a mechanical effect of the force of the toothsets on the motor unit when a limiting bearing force is reached. It may also be commanded following an alarm issued by some other element of the system such as a given motor torque level being reached.

Finally, in order to compensate for an angular variation between the output gear 9 of the motor unit 3 and the ring gear 4 of the wheel 5 which might be generated by deformation of the landing gear under load, the gear 9 is carried by the output shaft 7 of the motor unit 3 via a constant-velocity joint 29 which accepts an angular deformation while at the same time transmitting the drive torque without any variation in speed. This constant-velocity joint may, for example, be a sliding tripod joint or plunging ball joint. This use of a constant-velocity joint is not commonplace. Indeed, the conventional use of a constant-velocity joint is the same as that of a cardan joint, which means to say that it works in pure torsion, the radial and axial loadings being reacted by the bearings supporting the shafts. Now, in the present use, the constant-velocity joint is used to transmit a radial force (the bearing force of the clutch device) and a tangential force (the driving force). The joint is therefore able to absorb any angular misalignment between the reduction gear and the wheel.

In addition, the use of the runway tracks which define the meshing centre distance and the position of the constant-velocity joint supplement the device and allow a transmission by gearing that operates under heavy deformation of the wheel with respect to the reducer, for example an angular deformation of several degrees (for example of the order of +/−5°), to be achieved.

In the present application to an aeroplane, this motorizing system is used for example during the phases prior to take-off, after landing, i.e. for any movement across the ground as long as the speed is lower than the maximum authorized taxiing speed. During these phases, it is then possible not to use the aeroplane main engines, which means that fuel consumption, and therefore costs and pollutant emissions and $CO_2$ emissions can be reduced. Another impact of switching off the main engines of the aeroplane is that this lowers noise pollution.

It is not possible for the system to be engaged until the aircraft is on the ground and moving along at a speed below the maximum permitted taxiing speed. In all other cases, it disengages itself.

The system is designed to motorize the wheels of the aeroplane while at the same time tolerating the deformations of the landing gear.

Thus, the two links defining the instantaneous axis of rotation could be parallel.

Likewise, the actuating jack could move the motor unit into its in-mesh position, just as into its out-of-mesh position. The actuating jack could also be pneumatic or hydraulic. The spring could be replaced by a gas cylinder.

The strut could carry a different number of wheels, notably according to the size of the aeroplane (from one wheel to eight). There could also be several systems per wheel (one wheel driven by several motors). It might also be possible for just some of the wheels to be motorized (or even just one).

The present invention can be applied similarly to the motorizing of the nosegear of an aeroplane.

The invention claimed is:

1. A motorizing system for powering a wheel associated with a suspension of an aircraft so that the aircraft can be moved around on ground, the motorizing system comprising:
   a motor unit;
   a drive member that is attachable to the wheel, the wheel having a tire; and
   a clutch device that enables movement of the motor unit relative to the drive member,
   wherein the motor unit is a sprung mass of a suspension strut of the aircraft,
   wherein the drive member is an unsprung mass of the suspension strut,
   wherein the clutch device moves the motor unit to and from an engaged position, in which an output gear of the motor unit is connected to the drive member, and a disengaged position, in which the output gear is separated from the drive member, and
   wherein a positive transmission occurs between the motor unit and the drive member.

2. The motorizing system according to claim 1, wherein the motor unit includes:
   an electric motor, and
   a reduction system that connects a reduction-stage output shaft of the electric motor to the drive member via the output gear.

3. The motorizing system according to claim 2, wherein the reduction system is secured to the electric motor.

4. The motorizing system according to claim 1, wherein the clutch device enables the motor unit to disengage automatically if a load transmitted between the wheel and a motor of the motor unit exceeds a predetermined level.

5. The motorizing system according to claim 1, wherein the clutch device is arranged so that the motor unit is rotatable about a horizontal rotation axis with respect to the suspension strut.

6. The motorizing system according to claim 5, wherein the clutch device includes a plurality of links defining an instantaneous axis of rotation of the motor unit.

7. The motorizing system according to claim 5, wherein the clutch device includes a movement system that enables the motor unit to be moved to and from an engaged position and a disengaged position.

8. The motorizing system according to claim 7, wherein the movement system includes a driving element.

9. The motorizing system according to claim 8, wherein the driving element includes an actuating jack.

10. The motorizing system according to claim 9, wherein the actuating jack is an electric actuating jack that includes a drive motor arranged in the jack, a nut mounted to be translationally moveable, and a screw that converts a rotational movement of the drive motor into a translational movement of the nut.

11. The motorizing system according claim 8, wherein the movement system includes a return element structured to move the motor unit in a direction opposite to a direction imposed by the driving element.

12. The motorizing system according to claim 11, wherein the return element includes a return spring.

13. The motorizing system according to claim 12,
   wherein the driving element includes an actuating jack,
   wherein the actuating jack moves the motor unit into an in-mesh position, and
   wherein the return spring drives the motor unit into an out-of-mesh position.

14. The motorizing system according to claim 7, wherein the movement system applies to the motor unit a force higher than a limiting value necessary for the motor unit to remain in the engaged position.

15. The motorizing system according to claim 1, wherein the drive member is a ring gear that:
   is carried by a rim of the wheel, and
   enters into an in-mesh position with the output gear when the motor unit is in the engaged position.

16. The motorizing system according to claim 15, wherein the in-mesh position of the ring gear with the output gear is defined by two rolling lips carried by the ring gear abutting with two runway tracks carried by the output gear, the abutting occurring without sliding.

17. The motorizing system according to claim 15, wherein the output gear is carried by an output shaft of the motor unit via a constant-velocity joint.

18. A motorizing assembly for powering wheels associated with a suspension of an aircraft so that the aircraft can be moved around on ground, the assembly comprising first and second motorizing systems,
   wherein the first motorizing system powers a first wheel,
   wherein the second motorizing system powers a second wheel,
   wherein each of the first and second motorizing systems includes:
      a motor unit;
      a drive member that is attachable to the wheel, the wheel having a tire; and
      a clutch device that enables movement of the motor unit relative to the drive member to move the motor unit to and from an engaged position, in which an output gear of the motor unit is connected to the drive member, and a disengaged position, in which the output gear is separated from the drive member, such that a positive transmission occurs between the motor unit and the drive member, wherein the motor unit is a sprung mass of a suspension strut of the aircraft, and wherein the drive member is an unsprung mass of the suspension strut, wherein the suspension strut is shared by the first motorizing system and the second motorizing system, wherein the first and second wheels are coaxial, and wherein the motor unit of the first motorizing system and the motor unit of the second motorizing system are joined together.

19. The assembly according to claim 18, wherein the motor units of the first and second motorizing systems are arranged between the first and second wheels.

20. The assembly according to claim 19, wherein the motor units of the first and second motorizing systems are arranged behind the suspension strut.

21. The assembly according to claim 19, wherein the drive member of the first motorizing system is a first ring gear that:

is carried by a rim of the first wheel, and enters into an in-mesh position with the output gear of the first motorizing system when this motor unit is in an engaged position, wherein the drive member of the second motorizing system is a second ring gear that:

is carried by a rim of the second wheel, and enters into an in-mesh position with the output gear of the second motorizing system when this motor unit is in the engaged position, wherein the clutch device of the first motorizing system is same as the clutch device of the second motorizing system such that there is a single clutch device common to both the first and second motorizing systems, and wherein the single clutch device is structured to move the motor units of the first and second motorizing systems at a same time, the motor units being movable by the single clutch device to and from the engaged position and the disengaged position.

22. The assembly according to claim 21, wherein each of the motor units of the first and second motorizing systems includes:

an electric motor, and a reduction system that connects a reduction-stage output shaft of the electric motor to the drive member corresponding to that motor unit via the output gear, and wherein the motor units of the first and second motorizing systems are arranged in a V shape, which has two legs and a common point at which the two legs intersect, with the common point of the V shape corresponding to a common axis of output gears of the reduction systems, and with each of the two legs having an end corresponding to an axis of a corresponding one of the electric motors.

23. The assembly according to claim 21, wherein the motor units of the first and second motorizing systems are connected to the single clutch device via a pivoting connection so that the motor units are allowed relative horizontal movement to accommodate deformations of the first and second wheels.

* * * * *